United States Patent
Okamura

(10) Patent No.: US 9,841,065 B2
(45) Date of Patent: Dec. 12, 2017

(54) WET FRICTION DISK

(71) Applicant: AISIN KAKO KABUSHIKI KAISHA, Toyota-shi, Aichi (JP)

(72) Inventor: Hiroki Okamura, Nagoya (JP)

(73) Assignee: AISIN KAKO KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 14/665,676

(22) Filed: Mar. 23, 2015

(65) Prior Publication Data
US 2015/0275985 A1    Oct. 1, 2015

(30) Foreign Application Priority Data

Mar. 27, 2014  (JP) .................................. 2014-066945

(51) Int. Cl.
| | | |
|---|---|---|
| *F16D 13/64* | (2006.01) | |
| *F16D 13/74* | (2006.01) | |
| *F16D 65/12* | (2006.01) | |
| *F16D 69/00* | (2006.01) | |
| *F16D 13/69* | (2006.01) | |
| *F16D 65/02* | (2006.01) | |

(52) U.S. Cl.
CPC .......... *F16D 13/74* (2013.01); *F16D 13/648* (2013.01); *F16D 13/69* (2013.01); *F16D 65/127* (2013.01); *F16D 2065/1324* (2013.01); *F16D 2065/1364* (2013.01); *F16D 2069/004* (2013.01); *F16D 2069/009* (2013.01)

(58) Field of Classification Search
CPC .... F16D 13/64; F16D 13/72; F16D 2069/004; F16D 13/648; F16D 13/69; F16D 13/74; F16D 65/127; F16D 2065/1324
USPC .......................................... 192/113.36, 107 C
See application file for complete search history.

(56) References Cited

U.S. PATENT DOCUMENTS

| | | | | |
|---|---|---|---|---|
| 5,094,331 A | * | 3/1992 | Fujimoto | ............... F16D 13/74 192/107 R |
| 5,460,255 A | * | 10/1995 | Quigley | ................. F16D 13/64 188/264 D |
| 6,644,453 B2 | * | 11/2003 | Kremer | .................. F16D 13/64 192/107 C |

(Continued)

FOREIGN PATENT DOCUMENTS

| | | |
|---|---|---|
| JP | 2001-234946 | 8/2001 |
| JP | 2001-295859 A | 10/2001 |

(Continued)

OTHER PUBLICATIONS

Machine translation of the description of JP 2013-124747 A, downloaded from epo.org on Feb. 13, 2016.*

(Continued)

*Primary Examiner* — Richard Lorence
(74) *Attorney, Agent, or Firm* — Sughrue Mion, PLLC; Richard C. Turner

(57) ABSTRACT

A wet friction disk that can achieve a further reduction in the drag torque, which includes a ring-shaped core plate having a wave shape in a circumferential direction thereof, a friction member disposed on a principal surface of the core plate so as to being substantially shaped into a ring with a plurality of oil grooves, and the oil grooves each have a shape with a groove width that is narrowed from an inner circumference side toward an outer circumference side of the core plate.

3 Claims, 6 Drawing Sheets

(56) References Cited

U.S. PATENT DOCUMENTS

| | | | |
|---|---|---|---|
| 7,806,245 B2 * | 10/2010 | Oh ...................... | F16D 13/64 |
| | | | 192/113.34 |
| 2001/0042668 A1 | 11/2001 | Ono et al. | |
| 2005/0109576 A1 * | 5/2005 | Kitahara .............. | F16D 13/648 |
| | | | 192/113.36 |
| 2005/0217965 A1 | 10/2005 | Muranaka et al. | |

FOREIGN PATENT DOCUMENTS

| | | |
|---|---|---|
| JP | 2005-282648 A | 10/2005 |
| JP | 2009-052601 A | 3/2009 |
| JP | 2010-101402 A | 5/2010 |
| JP | 2013124747 A * | 6/2013 |

OTHER PUBLICATIONS

Communication from the Japanese Patent Office dated Feb. 23, 2016 in copending Japanese Application No. 2014-066945, with English translation.

Communication dated Sep. 13, 2016 from the Japanese Patent Office in counterpart Application No. 2014-066945.

* cited by examiner

WET FRICTION DISK

INCORPORATION BY REFERENCE

The present application claims priority under 35 U.S.C. §119 of Japanese Patent Application No. 2014-066945, filed on Mar. 27, 2014, the disclosure of which is expressly incorporated by reference herein in its entirety.

BACKGROUND OF THE INVENTION

Field of the Invention

The present invention relates to a wet friction disk. The present invention more particularly relates to a wet friction disk that is used in the presence of oil and that can be incorporated in a wet clutch, a wet brake, and the like.

Related Art

In the related art, wet clutches and wet brakes using a wet friction disk are used for torque transmission and braking. Specifically, wet clutches are used in automatic transmissions of vehicles and the like. Such a wet clutch has a function of transmitting driving power generated by a driving source such as an engine to a driven body such as an axle, and of shutting off the driving power. For example, in a case of using a wet friction disk shaped into a plate and associated with the driving source, and a separator plate associated with the driven body, the wet friction disk and the separator plate are arranged facing each other with a clearance interposed therebetween. Further, a lubricating fluid is supplied around the wet clutch and has a function of absorbing frictional heat caused between the plates and preventing wear in the plates. Then, in a state where a relative rotation of the two plates is performed while the two plates are spaced apart (idle running state), the driving power is not transmitted to the driven body. In a state where the two plates are pressed against each other, the driving power is transmitted from the driving source to the driven body.

In such a wet clutch, the clearance between the two plates is set to be small, for example, for purpose of improvement in responsiveness. However, since, in a state where the two plates are disengaged, the relative rotation of the two plates is performed while the two plates are spaced apart, a "drag torque" is caused depending on a amount of the lubricating fluid interposed between the plates and a lubricating state. In other words, there is a problem of unnecessarily consuming energy during the idle running because of generation of the drag torque. Thus, a reduction in the drag torque has been a challenge in recent years as part of rapid advancement of measures for the improvement of fuel efficiency.

A known technique to reduce the drag torque is described in JP-A 2009-052601.

A wet friction disk using a ring-shaped core plate having a wave shape in a circumferential direction thereof is disclosed in JP-A 2009-052601. This technique is excellent in that the use of a core plate having the wave shape in the circumferential direction enables a reduction in the drag torque in a wide range of rotation speed ranges in comparison with a core plate that does not have such a wave shape.

However, while a further reduction in the drag torque is demanded, especially a further reduction in the drag torque in a high rotation speed range is demanded in a case of using a core plate having a wave shape in the circumferential direction.

SUMMARY OF THE INVENTION

The present invention has been achieved in view of the challenge described above, and an object thereof is to provide a wet friction disk that uses a core plate having a wave shape in a circumferential direction thereof and that can achieve a further reduction in the drag torque.

The wet friction disk of the present invention is a wet friction disk having a ring-shaped core plate having a wave shape in a circumferential direction thereof; and a friction member disposed on a principal surface of the core plate so as to being substantially shaped into a ring with a plurality of oil grooves formed therein, wherein the wet friction disk includes one of the following modes (1) and (2):

(1) the friction member disposed on the principal surface of the core plate includes a plurality of segment pieces that is arranged to form the oil grooves therebetween, and (2) the friction member disposed on the principal surface of the core plate includes, as the oil grooves, a plurality of depressions formed by subjecting a friction surface of the friction member to press working, and wherein the oil grooves each have a shape with a groove width that is narrowed from an inner circumference side toward an outer circumference side of the core plate.

The ring-shaped core plate included in the present wet friction disk has a wave shape in the circumferential direction. Due to the wave shape in the circumferential direction, the drag torque caused by viscous drag of a lubricating fluid present between the present wet friction disk and a separator plate can be reduced during rotation at a low speed.

Additionally, oil grooves of the present wet friction disk each have a shape with a groove width that is narrowed from an inner circumference side toward an outer circumference side of the core plate. Due to this, the drag torque resulting from a lack of the lubricating fluid between the present wet friction disk and the separator plate can be reduced especially during the rotation at a high speed. This is because the lubricating fluid moving from the inner circumference side toward the outer circumference side can be likely to reside on a surface of a friction member during the rotation at a high speed. Due to this, the present wet friction disk is detached from the separator plate to promote lubrication therebetween during the rotation at a high speed and to suppress solid contact therebetween, and thereby the drag torque between the present wet friction disk and the separator plate can be reduced.

That is, the drag torque during the rotation at a low speed is reduced by the wave shape in the circumferential direction while the drag torque during the rotation at a high speed is reduced by the narrowing of the groove widths of the oil grooves, and thus the drag torque can be effectively reduced in a wide range of rotation speed ranges from a low rotation speed to a high rotation speed.

In the case where, the oil grooves each have a groove width $W_1$ at a narrowing start part and a groove width $W_2$ at a narrowing end part, with a ratio $W_2/W_1$ being 0.5 or less, and thereby the lubricating fluid especially during the rotation at a high speed is efficiently guided to a surface which is a friction surface of the friction member, and thus the drag torque between the present wet friction disk and the separator plate can effectively be reduced.

In the case where, the groove width $W_2$ of each of the oil grooves are 0 mm or more and 2 mm or less, and thereby the drag torque between the present wet friction disk and the separator plate can effectively be reduced since the lubricating fluid during the rotation at a high speed is reliably supplied to the surface of the friction member.

In the case where, the core plate includes 3 or more and 20 or less protrusions, and thereby the drag torque caused by the viscous drag of the lubricating fluid especially during the rotation at a low speed can effectively be reduced.

DESCRIPTION OF THE EMBODIMENTS

Figure 1:
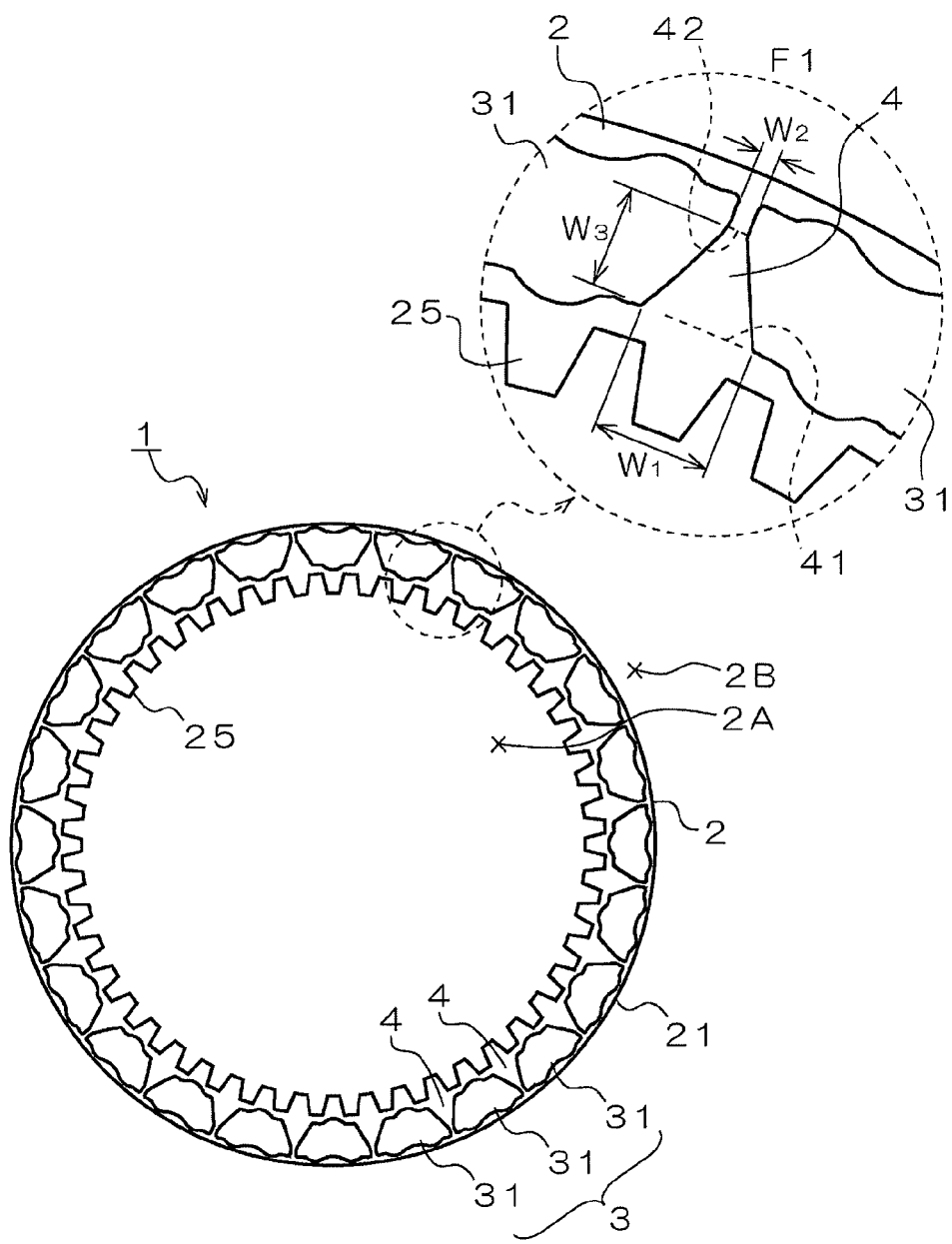
FIG. 1 is an overall plan view and a partial enlarged view describing an example of a wet friction disk according to the present invention.

The present invention will now be described with reference to the drawings. The following description is exemplary and is intended to describe embodiments of the present invention in an illustrative manner. It is intended to provide a description that is considered to be able to facilitate in the most effective manner the understanding of the principles and conceptual features of the present invention. In this regard, it is not intended to provide structural details of the present invention more than necessary for fundamental understanding of the present invention, but it is intended to give those skilled in the art a clear description together with the accompanying drawings of how the present invention is embodied in practice.

A wet friction disk 1 according to the present invention includes a ring-shaped core plate 2 having a wave shape in a circumferential direction thereof, and a friction member 3 disposed on a principal surface 21 of the core plate 2 so as to be substantially shaped into a ring with a plurality of oil grooves 4 formed therein.

Additionally, the oil grooves 4 each have a shape with a groove width that is narrowed from an inner circumference side 2A toward an outer circumference side 2B of the core plate 2 (see FIGS. 1 to 4).

The core plate 2 is shaped into a ring. The core plate 2 may have a ring shape (annular shape) with an opening formed in its midportion and, for example, a ratio $T_1/T_2$ of an outer diameter $T_1$ (the diameter at an outer circumference) to an inner diameter $T_2$ (the diameter at an inner circumference excluding spline inner teeth 25) can be made from 1.02 to 6. This ratio is preferably from 1.07 to 4 and more preferably from 1.1 to 1.5. Additionally, the core plate 2 may be a ring-shaped plate, and, for example, the thickness thereof can be made 0.3 to 14.5 mm. This thickness is preferably from 0.5 to 6 mm and more preferably from 0.7 to 2.5 mm.

Figure 2:
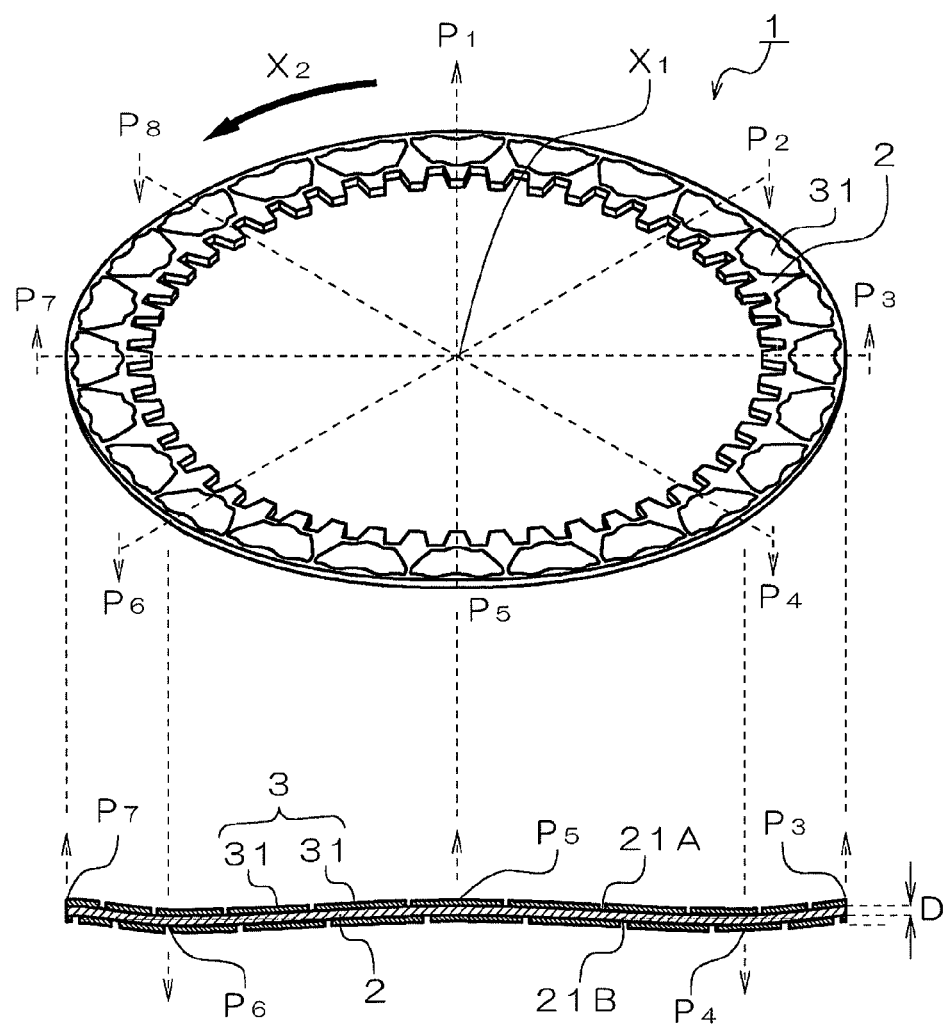
FIG. 2 is an overall perspective view and a side view describing an example of a wet friction disk according to the present invention.

Additionally, the core plate 2 used in the present invention has the wave shape in the circumferential direction. Having the wave shape in the circumferential direction means a mode of being shaped so as to have undulation in the front and back of the core plate 2, as illustrated in FIG. 2. In other words, the core plate 2 illustrated in FIG. 2 is shaped to have protrusions alternately on the front side and on the back side thereof at positions obtained by dividing the circumference equally into eight ($P_1$ to $P_8$).

Specifically, in the core plate 2 in FIG. 2, the principal surface 21 is made gently continuous so as to have maximum protrusions at the four positions $P_1$, $P_3$, $P_5$, and $P_7$ on a principal surface 21A which is the front side of the core plate 2, or so as to have maximum protrusions at the four positions $P_2$, $P_4$, $P_6$, and $P_8$ on a principal surface 21B which is the back side of the core plate 2, and the core plate 2 has generally the wave shape in the circumferential direction. The core plate 2 can be rotated about, for example, $X_1$ in a direction of $X_2$.

In this manner, when the core plate 2 has the wave shape in the circumferential direction, the area of a near region between the wet friction disk 1 and a separator plate 5 can be made small in comparison with a core plate having no wave shape.

Figure 5A:
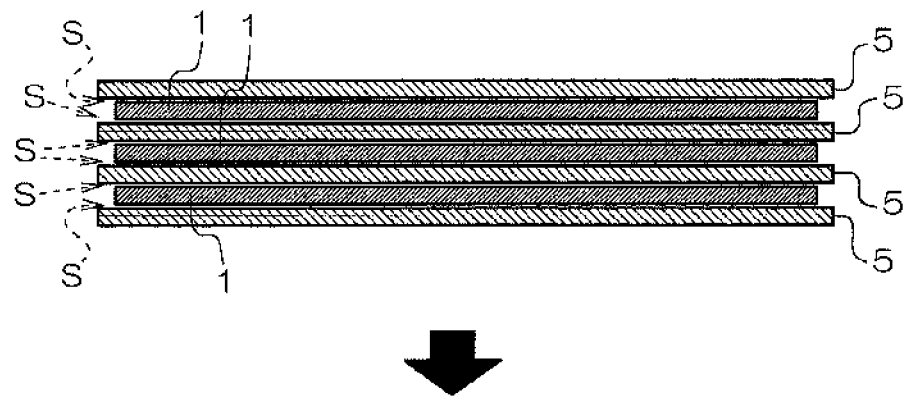
FIGS. 5A and 5B are schematic diagrams describing a correlation between a wet friction disk and a separator plate.
Figure 5B:
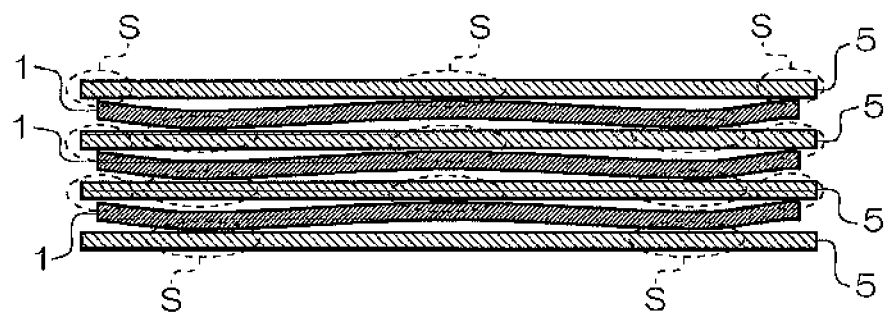

In other word, for example the wet friction disk 1 is used in such a manner that the wet friction disks 1 and separator plates 5 are alternately arranged, as illustrated in FIGS. 5A and 5B. As illustrated in FIG. 5A, when a core plate 2 has no wave shape, a gap between the core plate 2 and a separator plate 5 is kept substantially uniform along the entire circumference, and a near region S between a wet friction disk 1 and the separator plate 5 (a region where the wet friction disk 1 is in contact with the separator plate 5 when there is no lubricating fluid) extends over an entire surface of the wet friction disk 1 (actually, entire surfaces of segment pieces).

In contrast, as illustrated in FIG. 5B, when the core plate 2 has the wave shape in the circumferential direction, a near region and a spaced apart region are both present in a gap between the wet friction disk 1 and the separator plate 5. As a result, a near region S between the wet friction disk 1 and the separator plate 5 (the area of a region in which the wet friction disk 1 is in contact with the separator plate 5 when there is no lubricating fluid) is limited to a region surrounded by a broken line in FIG. 5B, and the area of the near region becomes small in comparison with the mode illustrated in FIG. 5A. In other words, as described above, due to the wave shape in the circumferential direction, the area of the near region becomes significantly small. As a result, the drag torque caused by viscous drag of the lubricating fluid present between the wet friction disk 1 and the separator plate 5 can effectively be reduced.

Note that the wave shape may be provided in the core plate 2 at regular intervals as illustrated in FIG. 2, or may be provided in the core plate 2 at irregular intervals. Further, the wave shape may be provided entirely in the core plate 2 as illustrated in FIG. 2, or may be provided only in a portion of the core plate 2. In the case where the wave shape is provided in a portion of the core plate 2, a planar portion is to be formed between wave shapes. Additionally, the wave shape may have protrusions evenly on both of the front and the back as illustrated in FIG. 2, or protrusions either on the front side or on the back side.

The number of protrusions formed by the wave shape in the circumferential direction (i.e. the positions $P_1$ to $P_8$ in FIG. 2) is not particularly limited, but the number is preferably three or more. Due to the three or more protrusions, the drag torque during the rotation at a low speed can effectively be reduced. Further, the number of the protrusions is preferably 20 or less. Although the number of the protrusions may exceed 20, the number of the protrusions is preferably 20 or less because there is no need to excessively increase a predetermined load for pressing the core plate 2 against the separator plate in comparison with the relate art. The number of the protrusions is preferably seven or more and 15 or less, and particularly preferably 10 or more and 14 or less.

Additionally, a protrusion length D at each protrusion in the wave shape (a distance from the middle of the thickness of the wave shaped core plate 2 to each protrusion on the surface of the core plate 2) is not particularly limited but is preferably 0.05 mm or more and 0.2 mm or less. This range is preferable because an effective reduction in the drag torque can be carried out while there is no need to excessively increase a design load for pressing the core plate 2 against the separator plate in comparison with the related art. The protrusion length D is preferably 0.08 mm or more and 0.15 mm or less. Note that the amount of protrusion at each protrusion may be same or different.

Although the core plate 2 may be formed of any material, a material such as S35C, S55C, SPCC, and NCH780 can be used.

Additionally, the core plate 2 has the principal surface 21. The principal surface 21 is a surface on which the friction member 3 is disposed. The principal surface 21 is included in the front surface and/or the back surface of the core plate 2.

Although a method of shaping the core plate 2 to have the wave shape in the circumferential direction is not particularly limited, the core plate 2 can be shaped to have the wave shape in the circumferential direction, for example, by sandwiching and holding a non-shaped core plate between upper and lower undulating molds under pressure to transfer the undulation to the non-shaped core plate. In this occasion, heating may not be performed, or heating may be performed (at 350 to 600° C., for example).

Additionally, upper and lower molds having protrusions or projection strips at locations corresponding to the protrusions may also be used in place of the upper and lower undulating molds described above. In the case where such molds having protrusions or projection strips are used, the wave shape can be formed by impressing the protrusions or the projection strips on the surface of the non-shaped core plate, and thereby causing a plastic flow due to local compression in the surface of the non-shaped core plate.

The friction member 3 is disposed on the principal surface 21 of the core plate 2. The friction member 3 has a function of adjusting the connection of the wet friction disk 1 with the separator plate 5 according to the contact condition between the wet friction disk 1 and the separator plate 5. In other words, the friction member 3 has functions of braking and transmitting torque to the separator plate 5.

The friction member 3 may be disposed only on the front surface side of the core plate 2 or may be disposed on both of the front surface side and the back surface side thereof (FIG. 2 illustrates a mode where the friction member 3 is disposed on the principal surface 21A, which is the front surface side, and on the principal surface 21B, which is the back surface side).

Additionally, although the friction member 3 may be fixed on the core plate 2 in any manner, the friction member 3 is usually joined to the core plate 2. A joining method is not limited, and examples thereof include heat fusion and gluing with an adhesive. Such joining methods may be used alone, or may be used in combination of two or more thereof.

The friction member 3 is disposed on the principal surface 21 of the core plate 2 so as to be substantially shaped into a ring with the plurality of oil grooves 4 formed therein. Any one of the following modes (1) and (2) is adopted in the present wet friction disk 1.

Figure 3:
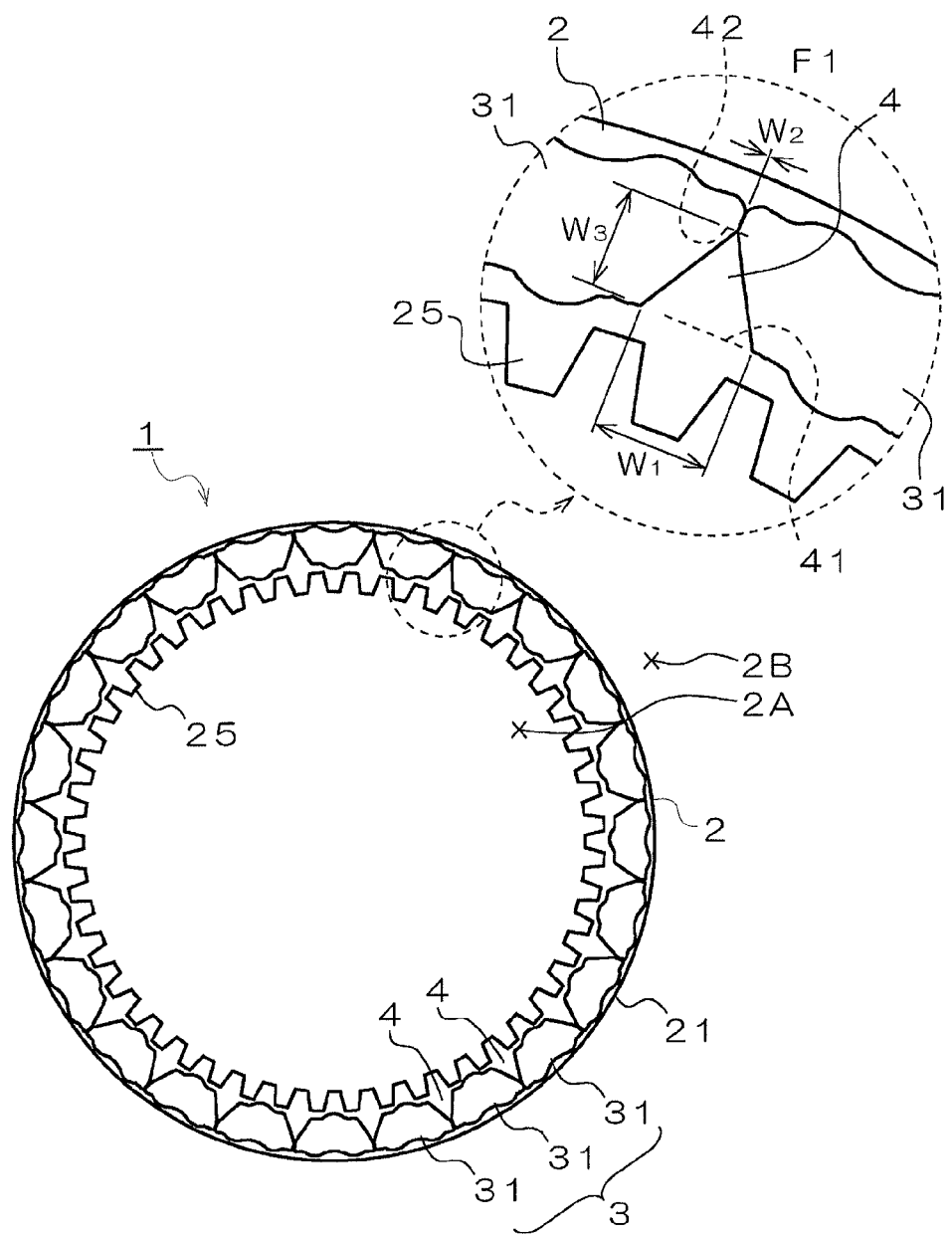
FIG. 3 is an overall plan view and a partial enlarged view describing another example of a wet friction disk according to the present invention.

In mode (1), the friction member 3 disposed on the principal surface 21 of the core plate 2 includes a plurality of segment pieces 31 that is arranged to form the oil grooves 4 therebetween (see FIGS. 1 to 3).

The shape of each of the segment pieces 31 is not particularly limited, as long as the segment pieces 31 can be arranged in such a manner that the oil grooves 4 each have a shape with a groove width that is narrowed from the inner circumference side 2A toward the outer circumference side 2B of the core plate 2, as described hereinafter. Usually, in order to obtain such oil grooves 4, each of the segment pieces 31 has a shape that is widened from the inner circumference side 2A toward the outer circumference side 2B of the core plate 2. The radially outer surface and the radially inner surface of each of the plurality of segment pieces 31 may have a wave shape. The wave shape of the radially outer surface may include more protrusions than the wave shape of the radially inner surface.

Additionally, although the number of the segment pieces 31 included in the friction member 3 is not particularly limited, the number of the segment pieces 31 is usually 20 or more. The number of the segment pieces 31 is preferably 20 or more and 60 or less and more preferably 30 or more and 50 or less.

Figure 4:
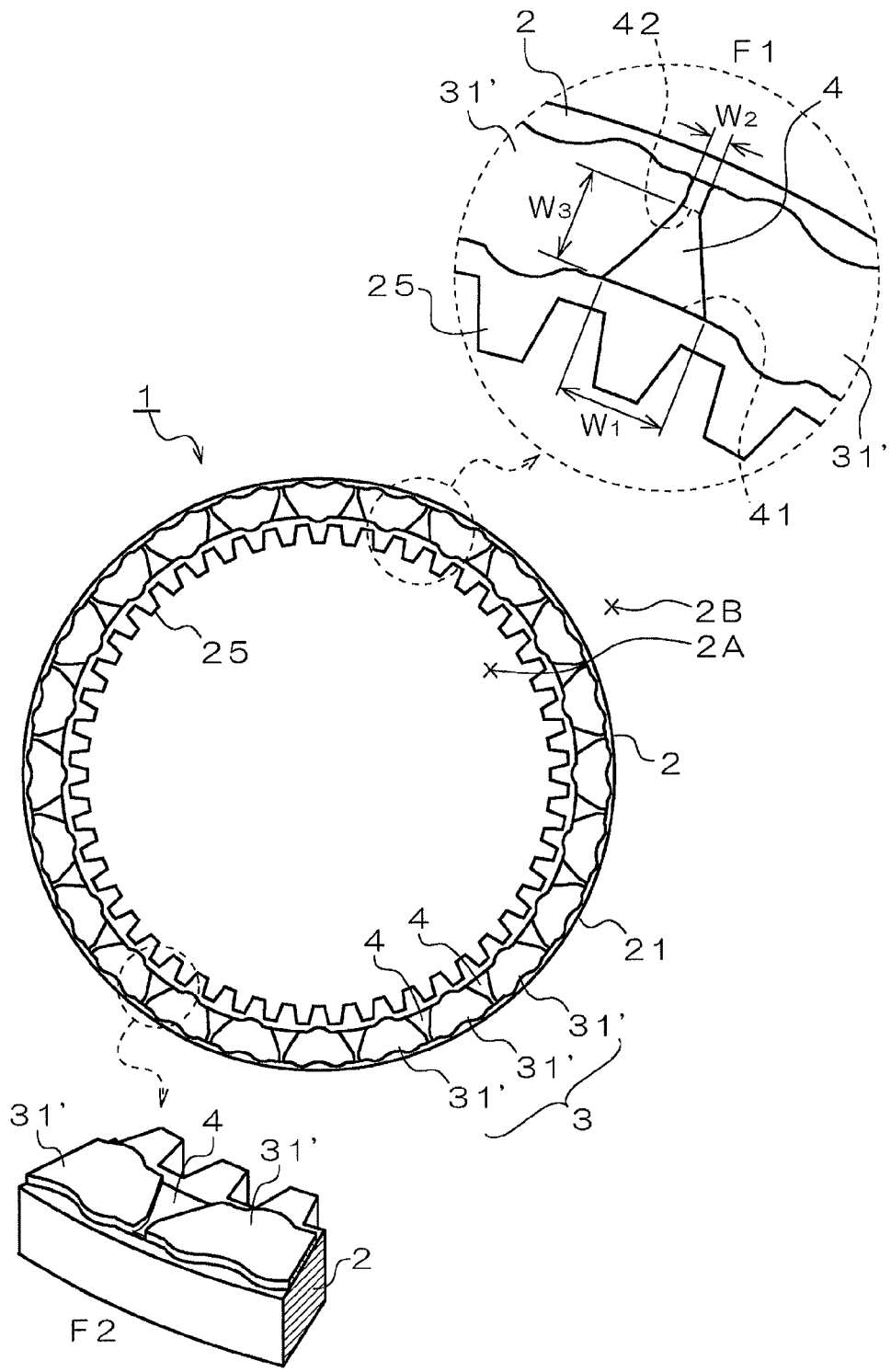
FIG. 4 is an overall plan view and a partial enlarged view describing yet another example of a wet friction disk according to the present invention.

On the other hand, in mode (2), the friction member 3 disposed on the principal surface 21 of the core plate 2 includes, as the oil grooves 4, a plurality of depressions formed by subjecting a friction surface of the friction member to press working or the like (see FIG. 4). More specifically, after the friction member pre-formed into an annular shape is disposed on the principal surface 21 of the core plate 2, necessary parts in the friction surface of the disposed pre-forming friction member are depressed and the formed depressions serve as the oil grooves 4. The plurality of depressions serving as the oil grooves are disposed between a plurality of undepressed portions. The radially outer surface and the radially inner surface of each of the plurality of undepressed portions may have a wave shape. The wave shape of the radially outer surface may include more protrusions than the wave shape of the radially inner surface.

Additionally, as a common aspect in modes (1) and (2), the present wet friction disk 1 includes the oil grooves 4 each having a shape with a groove width that is narrowed from the inner circumference side 2A toward the outer circumference side 2B of the core plate 2. Due to the oil grooves 4 each having the narrowed shape, the lubricating fluid present on the inner circumference side 2A of the core plate 2 is guided to the friction surface of the friction member 3 as the lubricating fluid moves from the inner circumference side 2A toward the outer circumference side 2B of the core plate 2. This effect becomes pronounced especially when the wet friction disk 1 is rotated at a high speed. That is, when the rotation speed increases, the lubricating fluid present between the wet friction disk 1 and the separator plate 5 is discharged by centrifugal force, so that the wet friction disk 1 becomes likely to come in contact with the separator plate 5. Due to this, the drag torque tends to increase, but in the oil grooves 4 of the present wet friction disk 1, movement within the oil grooves 4 of the lubricating fluid present on the inner circumference side 2A is promoted by centrifugal force from the inner circumference side 2A to the outer circumference side 2B of the core plate 2, and an amount of the movement of the lubricating fluid increases. Then, due to the narrowed oil grooves 4, in mode (1) for example, the lubricating fluid is considered to overflow the oil grooves 4 at their narrowed parts to spread onto friction surfaces of the segment pieces 31. In other words, in comparison with the case of the oil grooves that are not narrowed, the lubricating fluid becomes likely to reside on the surfaces of the friction member 3.

In this manner, the interposition of the lubricating fluid between the wet friction disk 1 and the separator plate 5 is promoted to detach the wet friction disk 1 from the separator plate 5, and solid contact between the wet friction disk 1 and the separator plate 5 can be suppressed.

The oil grooves 4 in the present wet friction disk 1 are not limited in terms of a specific narrowing mode of the oil grooves 4 as long as the effects due to the action described above are obtained. In other words, for example, the oil grooves 4 each may be communicated from the inner circumference side 2A to the outer circumference side 2B of the core plate 2 as illustrated in FIGS. 1 and 4 (each enlarged view F1), or the oil grooves 4 may each be formed as a groove on the inner circumference side 2A of the core plate 2, which is narrowed toward the outer circumference side 2B and is closed at a narrowing end part on the outer circumference side 2B, as illustrated in FIG. 3 (the enlarged view F1).

Additionally, a part of the oil grooves 4 may be communicated from the inner circumference side 2A to the outer circumference side 2B and the other of the oil grooves 4 may be closed at a narrowing end part 42.

when the oil grooves 4 each have a groove width $W_1$ at a narrowing start part 41 and a groove width $W_2$ at a narrowing end part 42, a ratio of the groove widths $W_2/W_1$ is preferably 0.5 or less (when $W_2$ is zero, the ratio $W_2/W_1$ may be zero). Due to such a degree of narrowing, at least a portion of the lubricating fluid supplied from the inner circumference side 2A during the rotation at a high speed such as a relative rotation speed of 2000 rpm is guided to a surface that is the friction surface of the friction member 3, and this guided lubricating fluid promotes the separation of the wet friction disk 1 and the separator plate 5, resulting in a reduction in the drag torque. Further, the ratio of the groove widths $W_2/W_1$ is more preferably 0.2 or more and 0.4 or less (where $W_2>0$).

Additionally, the groove width $W_2$ at the narrowing end part 42 is preferably 0 mm or more and 2.5 mm or less. Especially, in a case where the groove width $W_2$ exceeds 0 mm, i.e., the oil grooves 4 are communicated from the inner circumference side 2A to the outer circumference side 2B of the core plate 2, the groove width $W_2$ is more preferably 1 mm or more and 2.5 mm or less.

On the other hand, the groove width $W_1$ is preferably 2 mm or more and 5 mm or less and more preferably 2 mm or more and 4 mm or less.

Further, when the oil grooves 4 each have a groove length $W_3$ from the narrowing start part 41 to the narrowing end part 42, the groove length $W_3$ is preferably ½ or more of the width of the friction member 3. Note that the width of the friction member 3 is a radial distance of the friction member 3, and means an interval between the maximum diameter on the outer circumference side and the minimum diameter on the inner circumference side.

Additionally, in mode (1), the narrowed oil grooves 4 may be formed at all locations between the segment pieces 31 or may be formed at some locations between the segment pieces 31. In other words, effect of discharging the lubricating fluid from the inner circumference side 2A to the outer circumference side 2B of the core plate 2 can be controlled by the arrangement of the narrowed oil grooves 4 and the number thereof. In other words, the efficiency of discharging the lubricating fluid can be controlled by using in combination the narrowed oil grooves and the oil grooves that are not narrowed. Usually, the narrowed oil grooves 4 are preferably provided in a half or more of all the gaps between the adjacent segment pieces 31 and more preferably provided in all the gaps there between.

Although the composition of the friction member 3 is not particularly limited, the friction member can be obtained by mixing base fiber and a filler to form a papermaking substance, and impregnating the obtained papermaking substance with a thermosetting resin to be subsequently heated to harden.

As the base fiber, cellulose fiber (pulp), acrylic fiber, aramid fiber, and the like can be used, and various types of fiber such as synthetic fiber, regenerated fiber, inorganic fiber, and natural fiber can also be used. Usually, as the base fiber, fiber with an average length of 0.5 to 5 mm and an average diameter of 0.1 to 6 μm is used.

As the filler, cashew dust which serves as a friction modifier, graphite and/or molybdenum disulfide which serve (s) as a solid lubricant, diatomaceous earth which serves as an extender, and the like can be used. These may be used alone or in combination of two or more thereof. Further, as the thermosetting resin, a phenol resin and/or its modified resin can be used.

Embodiments

Embodiments of the present invention will be described below. Note that a description common in the embodiments will be omitted.

First Embodiment

A wet friction disk 1 according to a first embodiment (see FIGS. 1 to 2) includes a core plate 2 having a wave shape in a circumferential direction thereof, and a friction member 3 disposed on a principal surface 21 of the core plate 2 (each of a principal surface 21A which is the front side, and a principal surface 21B which is the back side).

The core plate 2 is made of NCH780 and is shaped by pressure application and maintenance using molds to have the wave shape in the circumferential direction. Additionally, the wave shape in the circumferential direction is formed by shaping the core plate 2 to have protrusions alternately on the front side and on the back side thereof at positions obtained by dividing the circumference equally into eight, so that the wave shape has eight protrusions.

Further, a protrusion length D at each protrusion in the wave shape (a distance from the middle of the wave of the core plate 2 to each protrusion on the surface of the core plate 2) is made in the range of 0.05 mm or more and 0.2 mm or less.

Additionally, the core plate 2 has spline inner teeth 25 formed like those of a gear on its inner circumference. The spline inner teeth 25 are disposed so as to be able to engage with splines arranged on the outer circumference of a hub that serves as a rotation shaft for the wet friction disk 1. Then, a ratio $T_1/T_2$ of an outer diameter $T_1$ of the core plate 2 to an inner diameter $T_2$ of the core plate 2 (a diameter defined by the inner circumference of the core plate 2 excluding the spline inner teeth 25) is made from 1.02 to 6. Due to this shape, a necessary and sufficient area of the principal surface 21 on which the friction member 3 is arranged can be secured. Further, the thickness of the core plate 2 is made from 0.3 to 14.5 mm.

Further, in the core plate 2, a plurality of segment pieces 31 is joined on the principal surface 21 in each of the front and the back of the core plate 2, and the friction member 3 is formed as a collection of the segment pieces 31.

Each of the segment pieces 31 is substantially shaped in an arc that is widened from an inner circumference side 2A toward an outer circumference side 2B of the core plate 2. Then, the plurality of segment pieces 31 is spaced apart at predetermined intervals to be arranged on the core plate 2 in an annular shape as a whole. Additionally, gaps formed between the segment pieces 31 serve as oil grooves 4.

Additionally, the oil grooves 4 each have a shape with a groove width that is narrowed from the inner circumference side 2A toward the outer circumference side 2B of the core plate 2, because each of the segment pieces 31 is substantially shaped in an arc that is widened from the inner circumference side 2A toward the outer circumference side 2B of the core plate 2. Specifically, in each of the oil grooves 4, a groove width $W_1$ at a narrowing start part 41 is made in the range of 2 mm or more and 5 mm or less, and a groove width $W_2$ at a narrowing end part 42 is made in the range of 1.0 mm or more and 2.5 mm or less, with a ratio of the groove widths $W_2/W_1$ being made in the range of 0.5 or less.

In other words, since the wet friction disk 1 according to the first embodiment includes the core plate 2 having the wave shape in the circumferential direction, the area of a near region between a separator plate 5 and the wet friction disk 1 is significantly reduced in comparison with a case of a wet friction disk with no wave shape. For this reason, since the separator plate and the wet friction disk 1 are less likely to affect each other during the rotation at a low speed, a drag torque generated between the separator plate and the wet friction disk 1 can be reduced.

Here, since centrifugal force significantly acts when the relative rotation speed between a wet friction disk 1 and the separator plate 5 reaches a high speed such as 2000 rpm, the wet friction disk 1 and the separator plate 5 are likely to lack the lubricating fluid therebetween, and the drag torque tends to increase. On this occasion, the oil grooves 4 of the wet friction disk 1 according to the first embodiment each have the groove width that is narrowed from the inner circumference side 2A toward the outer circumference side 2B of the core plate 2, and thus the lubricating fluid can be likely to reside on a surface of the friction member 3. Due to this, the wet friction disk 1 is detached from the separator plate 5 to increase lubricating fluid therebetween during the rotation at a high speed and to suppress the solid contact therebetween, and thereby the drag torque between the wet friction disk 1 and the separator plate can be reduced.

In this manner, the drag torque during the rotation at a low speed is reduced by the wave shape in the circumferential direction while the drag torque during the rotation at a high speed is reduced by the narrowed oil grooves 4, and thus the drag torque can be effectively reduced in a wide range of rotation speed ranges from a low rotation speed to a high rotation speed.

Second Embodiment

A wet friction disk 1 according to a second embodiment (see FIG. 3) differs from the wet friction disk 1 according to the first embodiment in that a groove width $W_2$ at a narrowing end part 42 is made 0 mm.

The wet friction disk 1 according to the second embodiment (see FIG. 3) includes a core plate 2 having a wave shape in a circumferential direction thereof, and a friction member 3 disposed on a principal surface 21 of the core plate 2 (each of a principal surface 21A which is the front side, and a principal surface 21B which is the back side).

In the core plate 2 according to the second embodiment, a plurality of segment pieces 31 is joined on the principal surface 21 in each of the front and the back thereof, and the friction members 3 is formed as a collection of the segment pieces 31.

Each of the segment pieces 31 is substantially shaped in an arc that is widened from an inner circumference side 2A toward an outer circumference side 2B of the core plate 2. Then, the plurality of segment pieces 31 is disposed in such a manner that sides of the adjacent segment pieces 31 are in close contact with each other except portions serving as substantially triangular oil grooves 4, and is arranged on the core plate 2 in an annular shape as a whole.

The oil grooves 4 each have a shape with a groove width that is narrowed from the inner circumference side 2A toward the outer circumference side 2B of the core plate 2, because each of the segment pieces 31 is substantially shaped in an arc that is widened from the inner circumference side 2A toward the outer circumference side 2B of the core plate 2. Specifically, in each of the oil grooves 4, a groove width $W_1$ at a narrowing start part 41 is made in the range of 2 mm or more and 5 mm or less and a groove width $W_2$ at a narrowing end part 42 is made 0 mm.

In other words, the wet friction disk 1 according to the second embodiment also has a similar configuration to that of the wet friction disk 1 according to the first embodiment, and thus can effectively reduce the drag torque in a wide range of rotation speed ranges from a low rotation speed to a high rotation speed to exhibit the excellent effects as described above.

Third Embodiment

A wet friction disk 1 according to a third embodiment (see FIG. 4) includes, as oil grooves 4, a plurality of depressions formed by subjecting a friction surface of a friction member 3 disposed on a principal surface 21 in each of the front and the back of a core plate 2 to press working. In other words, the wet friction disk 1 according to the third embodiment differs from the wet friction disks 1 according to the first and second embodiments which include the oil grooves 4 as the gaps between the adjacent segment pieces 31.

The wet friction disk 1 according to the third embodiment (see FIG. 4) includes the core plate 2 having a wave shape in a circumferential direction thereof, and the friction member 3 disposed on the principal surface 21 of the core plate 2 (each of a principal surface 21A which is the front side, and a principal surface 21B which is the back side).

The core plate 2 according to the third embodiment includes the one friction member 3 on the principal surface 21 in each of the front and the back thereof.

The friction member 3 has a plurality of depressions formed by subjecting the friction surface thereof to press working, at substantially regular intervals, and these depressions serve as the oil grooves 4 (see an enlarged view F2 in FIG. 4). On the other hand, a part of the friction member 3 in which the friction surface is not subjected to press working is left as a projection, and has an island portion 31'. The island portion 31' is substantially shaped in an arc that is widened from an inner circumference side 2A toward an outer circumference side 2B of the core plate 2.

The oil grooves 4 each have a shape with a groove width that is narrowed from the inner circumference side 2A toward the outer circumference side 2B of the core plate 2. Specifically, in each of the oil grooves 4, a groove width $W_1$ at a narrowing start part 41 is made in the range of 2 mm or more and 5 mm or less and a groove width $W_2$ at a narrowing end part 42 is made in the range of 0 mm or more and 2.5 mm or less, with a ratio of the groove widths $W_2/W_1$ being made in the range of 0.5 or less.

In other words, as a result, the wet friction disk 1 according to the third embodiment also has a similar configuration to that of the wet friction disk 1 according to the first embodiment, and thus can effectively reduce the drag torque in a wide range of rotation speed ranges from a low rotation speed to a high rotation speed to exhibit the excellent effects as described above.

Test Examples

The present invention will be described below by means of test examples.
[1] Wet Friction Disk Wet friction disks 1 in Example 1 and Comparative Examples 1 to 3 including configurations as described in Table 1 were prepared.
(1) Core Plate Ring-shaped core plates 2 each having the shape like the first embodiment described above and being made of NCH780 with a thickness of 0.96 mm, an outer diameter $T_1$ of 158 mm, and an inner diameter $T_2$ of 144 mm were prepared.

Among them, the core plates in Example 1 and Comparative Example 2 each have a "wave shape in the circumferential direction," as described in Table 1. The "wave shape in the circumferential direction" is formed by shaping each of the core plates 2 to have 11 protrusions alternately on the front side and on the back side at positions obtained by dividing the circumference equally into 11, so that the wave shape has eleven protrusions. The protrusion length D is 0.13 mm.
(2) Segment Pieces Each of segment pieces 31 is joined on principal surfaces 21A and 21B, which are the front and the back of each of the core plates 2, by application of pressure and heat. A schematic plane shape of each of the wet friction disks 1 is made according to either FIG. 6 or 7 as described in Table 1. The segment pieces 31 each have the radial width (an interval between a maximum diameter passing through an end of a projection on the outer circumference side and a minimum diameter passing through an end of the projection on the inner circumference side) of 6 mm.

Further, In Example 1 and Comparative Example 3, "narrowed oil grooves" are formed according to the shape and arrangement of the segment pieces 31. In detail, The "narrowed oil grooves" are formed as gaps between the 40 adjacent segment pieces 31 present on the principal surface 21 on one side (i.e. 80 pieces on both sides). Additionally, the narrowed oil grooves 4 each have a groove width $W_1$ at a narrowing start part 41 of 4 mm and a groove width $W_2$ at a narrowing end part 42 of 1 mm, with a ratio $W_2/W_1$ being 0.25. Additionally, the narrowed oil grooves 4 each have a groove length $W_3$ from the narrowing start part 41 to the narrowing end part 42 of 4 mm, with a ratio of $W_3/W_1$ being 1. Further, the narrowed oil grooves 4 each have a narrowed constant part with the length of 1 mm (the length of a constant-width part of each of the oil grooves 4, that is, a radial length of the part having constant-width $W_2$).

Note that each of the segment pieces 31 is obtained by forming a paper with a base fiber such as pulp and aramid fiber, a friction modifier such as cashew dust, and a filler such as diatomaceous earth, and impregnating the obtained paper with a thermosetting resin (resin binder) to be subsequently heated to harden.

Figure 6:
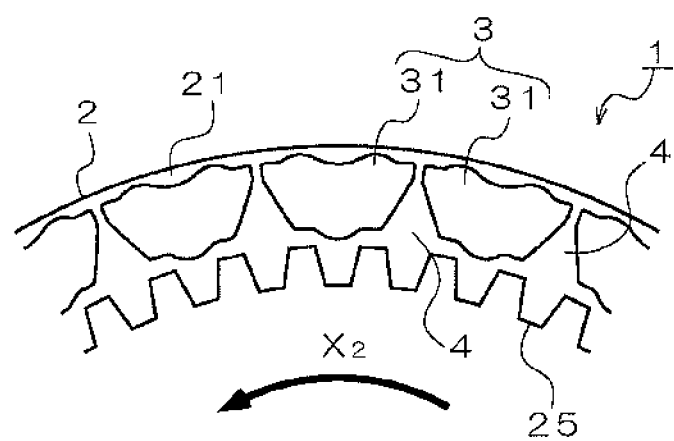
FIG. 6 is a schematic diagram describing a wet friction disk according to an example.
Figure 7:
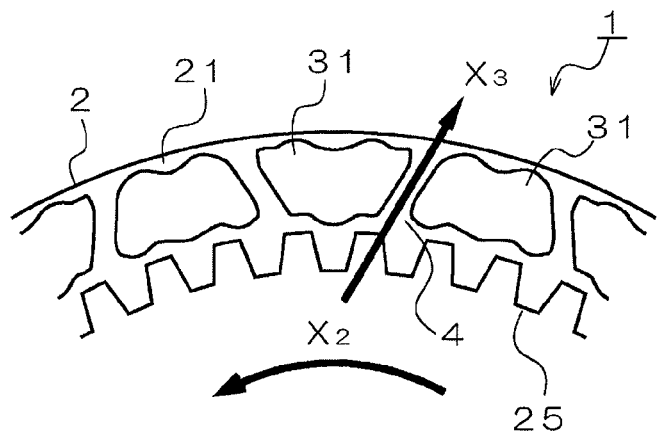
FIG. 7 is a schematic diagram describing a wet friction disk according to a comparative example.

Additionally, arrows $X_2$ in FIGS. 6 and 7 represent rotation directions. Further, an arrow $X_3$ in FIG. 7 represents a direction in which the lubricating fluid is likely to be discharged when the wet friction disks are rotated in the direction indicated by the arrow $X_2$ in this mode.

TABLE 1

| | wave shape | narrowed oil grooves | schematic plane shape |
| --- | --- | --- | --- |
| Ex. No. 1 | ○ | ○ | FIG. 6 |
| CompEx. No. 1 | x | x | FIG. 7 |
| CompEx. No. 2 | ○ | x | FIG. 7 |
| CompEx. No. 3 | x | ○ | FIG. 6 |

[2] Correlation Between Drag Torque and Rotation Speed

Figure 8:
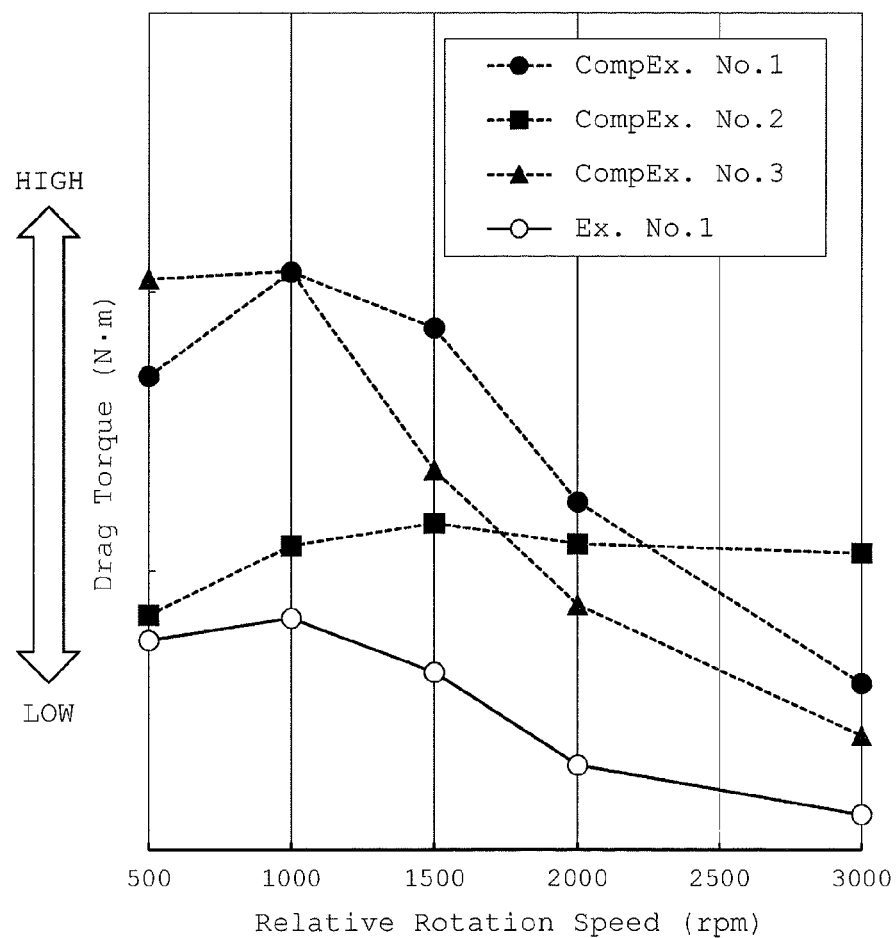
FIG. 8 is a graph illustrating correlations between a drag torque and a rotation speed obtained with use of wet friction disks in Example 1 and Comparative Examples 1 to 3.

The three wet friction disks 1 in each of Example 1 and Comparative Examples 1 to 3 obtained in [1] described above were used for measurement under conditions described below with an SAE friction tester at the rotation speeds between 500 and 3000 rpm. The obtained results are described in a graph illustrated in FIG. 8 (an upper position on a vertical axis in FIG. 8 represents a larger drag torque).

The three wet friction disks 1 were set as specimen under the environment of an automatic transmission fluid (ATF) temperature of 40° C. (although "ATF" is a registered trademark of Idemitsu Kosan Co., Ltd., it is abbreviated as "ATF" herein without any relation with the trademark), an ATF quantity of 1000 mL/minute (no shaft core lubrication), and a pack clearance of 0.20 mm/plate. The rotation speed was varied from 500 to 3000 rpm, and a drag torque (N-m) was measured at 6 points of 500 rpm, 1500 rpm, 2000 rpm, 2500 rpm, and 3000 rpm. Additionally, the measurement time was made 15 seconds at the each rotation speed, and the number of repetition was made five times.
[3] Effects of Test Examples Comparative Example 1 is a mode of having a configuration including no wave shape in the circumferential direction nor narrowed oil grooves as described in Table 1. As described in FIG. 8, it can be seen that in Comparative Example 1 a high drag torque especially in the range from a low rotation speed range to a mid rotation speed range (especially from 500 to 2000 rpm) is caused. Then, it can be seen that the drag torque is reduced as the rotation speed increases.

Additionally, Comparative Example 2 is a mode of having the wave shape in the circumferential direction but having no narrowed oil grooves. It can be seen that in Comparative Example 2 the drag torque is reduced in comparison with Comparative Example 1 in the range from the low rotation speed range to a mid rotation speed range (especially from 500 to 2000 rpm). Its effect is pronounced especially at a low rotation speed range from 500 to 1500 rpm. However, it can be seen that the drag torque increases as the rotation speed increases, and that as a result the drag torque becomes larger than that in Comparative Example 1 having no wave shape in a high rotation speed range of approximately 2250 rpm or more.

Further, Comparative Example 3 is a mode of having the narrowed oil grooves but having no wave shape in the circumferential direction. Comparative Example 3 demonstrates a mostly similar tendency to Comparative Example 1 in all the rotation speed ranges from low speed to high speeds, and it can be seen that there is a slightly larger effect of reducing the drag torque in all the rotation speed ranges than that in Comparative Example 1.

In contrast with Comparative Examples 1 to 3, Example 1 is a mode of having a configuration including both of the wave shape in the circumferential direction and the narrowed oil grooves. According to Example 1, a pronounced effect of reducing the drag torque is observed in all the rotation speed ranges from a low rotation speed range to a high rotation speed range, in comparison with Comparative Examples 1 to 3.

Particularly, in comparison with Comparative Example 2 having the wave shape in the circumferential direction alone, the effect of reducing the drag torque in a high rotation speed range is extremely pronounced in Example 1. Moreover, the degree of the effect in Example 1 is a pronounced reduction that clearly exceeds values expected from Comparative Example 2 having the wave shape in the circumferential direction alone and Comparative Example 3 having the narrowed oil grooves alone.

That is, although it is considered that a value of the drag torque in the low rotation speed range from 500 to 1800 rpm depends on the effect of the wave shape and that a value of the drag torque in the high rotation speed range from 1800 to 3000 rpm depends on the effect of the narrowed oil grooves, Example 1 according to the present invention demonstrates smaller values than the values in Comparative Examples 2 and 3 in the entire range from a low rotation speed range to a high rotation speed range. In other words, it can be seen that, due to the configuration including both of the wave shape in the circumferential direction and the narrowed oil grooves, there is exhibited a synergistic effect of reducing the drag torque, which is unpredictable in the case of including one of the wave shape in the circumferential direction and the narrowed oil grooves.

Note that the present invention is not limited to the specific examples described above, and various modifications according to purposes and application are possible within the scope of the present invention.

INDUSTRIAL APPLICABILITY

The wet friction disk according to the present invention is not particularly limited in terms of application, and is widely applied to, for example, automobiles (four-wheeled vehicles, two-wheeled vehicles, and the like), railway vehicles, ships, and airplanes. Among them, as for automobile supplies, the wet friction disk according to the present invention is suitably used in an automatic transmission (AT). Although the single wet friction disk or a plurality of the wet friction disks according to the present invention may be used in a transmission, the use of the plurality thereof is preferable. An increase in the number of the present wet friction disks used in one transmission can achieve a correspondingly increased effect. In other words, the drag torque can be reduced more effectively in a multiplate wet clutch using many wet friction disks.

REFERENCE SIGNS LIST

1: Wet friction disk
2: Core plate
21: Principal surface
21A: principal surface on front side
21B: principal surface on back side
2A: Inner circumference side of core plate
2B: Outer circumference side of core plate
25: Spline inner teeth
3: Friction member
31: Segment piece
31': Island portion
4: Oil groove
41: Narrowing start part
42: Narrowing end part
5: Separator plate
D: Protrusion length
$W_1$: Groove width at narrowing start part
$W_2$: Groove width at narrowing end part
$W_3$: Groove length from narrowing start part to narrowing end part

Having now fully described the present invention, it will be apparent to one of ordinary skill in the art that many changes and modifications can be made thereto without departing from the spirit or scope of the invention as set forth herein.

What is claimed is:

1. A wet friction disk, comprising:
   a ring-shaped core plate having a wave shape in a circumferential direction thereof; and
   a friction member disposed on a principal surface of the core plate so as to being substantially shaped into a ring with a plurality of oil grooves formed therein including a plurality of oil grooves formed between adjacent maximum protrusion point and minimum protrusion point of the wave shape of the core plate,
   wherein the wet friction disk includes one of the following modes (1) and (2):
   (1) the friction member disposed on the principal surface of the core plate includes a plurality of segment pieces that is arranged to form the oil grooves therebetween, and
   (2) the friction member disposed on the principal surface of the core plate includes, as the oil grooves, a plurality of depressions formed by subjecting a friction surface of the friction member to press working,
   wherein a groove width of each of the oil grooves is narrowed in a narrowing portion from an inner circumference side toward an outer circumference side of the core plate, and an end part of the narrowing portion is located distant from an innermost circumferential side and an outermost circumferential side of the friction member,
   wherein the core plate has the wave shape including 7 or more and 15 or less protrusions,
   wherein each of the oil grooves has a groove width $W_1$ at a narrowing start part and a groove width $W_2$ at a narrowing end part, with a ratio of the groove widths $W_2/W_1$ being 0.2 or more and 0.4 or less, and
   wherein the groove width $W_2$ is 1 mm or more and 2.5 mm or less.

2. The wet friction disk according to claim 1, wherein the wet friction disk includes the mode (1), and the number of segment pieces is 30 or more and 60 or less.

3. The wet friction disk according to claim 1, wherein the wet friction disk includes the mode (1), and wherein a radially outer surface and a radially inner surface of each of the plurality of segment pieces has a wave shape, the wave shape of the radially outer surface includes more protrusions than the wave shape of the radially inner surface.

* * * * *